(12) United States Patent
Strandwitz et al.

(10) Patent No.: US 7,944,484 B2
(45) Date of Patent: May 17, 2011

(54) SELF-CONTAINED WIRELESS CAMERA DEVICE, WIRELESS CAMERA SYSTEM AND METHOD

(75) Inventors: Peter Strandwitz, Neenah, WI (US);
Robert Kniskem, Fort Wayne, IN (US);
Gary D. Schulz, Cary, IL (US);
Jan-Michael Wyckoff, Schaumburg, IL (US)

(73) Assignee: MemoryLink Corporation, Neenah, WI (US)

( * ) Notice: Subject to any disclaimer, the term of this patent is extended or adjusted under 35 U.S.C. 154(b) by 0 days.

(21) Appl. No.: 12/207,773

(22) Filed: Sep. 10, 2008

(65) Prior Publication Data

US 2009/0002515 A1 Jan. 1, 2009

Related U.S. Application Data

(60) Continuation of application No. 10/351,906, filed on Jan. 27, 2003, now Pat. No. 7,864,216, which is a division of application No. 09/102,457, filed on Jun. 22, 1998, now Pat. No. 6,522,352.

(51) Int. Cl.
*H04N 5/228* (2006.01)
(52) U.S. Cl. .................................. 348/222.1; 348/211.99
(58) Field of Classification Search .............. 348/231.99, 348/222.1, 207.99, 211.99
See application file for complete search history.

(56) References Cited

U.S. PATENT DOCUMENTS 6,300,976 B1 * 10/2001 Fukuoka .................. 348/231.99

OTHER PUBLICATIONS

U.S. District Court, Northern District of Illinois, Civil Docket for Case No. 1:08-cv-03301, "Memorylink Corp. v. Motorola, Inc.", 5 pages, printed Nov. 12, 2008.
In the U.S. District Court, Northern District of Illinois, Eastern Division, Case No. 1:08-cv-03301, Complaint for Inventorship Correction and for Patent Infringement, "Memorylink Corp. v. Motorola, Inc.", filed Jun. 9, 2008.
In the U.S. District Court, Northern District of Illinois, Eastern Division, Case No. 1:08-cv-03301, Motorola, Inc.'s Motion to Dismiss, "Memorylink Corp. v. Motorola, Inc.", filed Aug. 1, 2008.
In the U.S. District Court, Northern District of Illinois, Eastern Division, Case No. 1:08-cv-3301, Memorandum in Support of Motorola, Inc.'s Motion to Dismiss, "Memorylink v. Motorola, Inc.", filed Aug. 1, 2008.
In the U.S. District Court, Northern District of Illinois, Eastern Division, Case No. 1:08-cv-3301, Memorylink's Response in Opposition to Motorola's Motion to Dismiss, "Memorylink v. Motorola, Inc.", filed Oct. 1, 2008.

(Continued)

*Primary Examiner* — Tuan Ho
(74) *Attorney, Agent, or Firm* — Banner & Witcoff, Ltd (57) ABSTRACT

A self-contained wireless camera (10) and a wireless camera system (25) having such a device and a base station (20). Video processing circuitry (200, 210) of the camera device receives video signals from a camera (130) and provides processed video signals. A radio receiver (101) receives processed video signals from the base station or another camera device. Images from the camera or the base station are displayed in a selected manner on a display or monitor (140). The base station device (20) receives processed video signals, stores them and retransmits them. A command signal is received by the radio receiver to modify operation in such a manner as to control bandwidth usage. Wireless camera devices can adjust their operation to accommodate other wireless camera devices. Different transport protocol modules 230 and 240 can be selected according to the application that the user selects for operation.

13 Claims, 8 Drawing Sheets

OTHER PUBLICATIONS

In the U.S. District Court, Northern district of Illinois, Eastern Division, Case No. 1:08-cv-3301, Reply Memorandum in Support of Motorola, Inc.'s Motion to Dismiss, "*Memorylink v. Motorola, Inc.*", filed Oct. 27, 2008.

United States District Court Northern District of Illinois—CM/ECF LIVE, Ver 3.23 (Chicago) Civil Docket for Case#: 1:08-cv-03301 (*Memorylink Corp. v. Motorola Inc.*) printed on Nov. 3, 2009 from PACER.

* cited by examiner

|  |  | EXAMPLE 1 | EXAMPLE 2 | EXAMPLE 3 |
|---|---|---|---|---|
| IMAGE PARAMETERS | FRAME SIZE | 512 x 512 | 512 x 512 | 512 x 512 |
|  | FRAME RESOLUTION | 270 x 352 | 270 x 352 | 480 x 352 |
|  | FRAME RATE | 15/SEC | 30/SEC | X |
|  | COMPRESSION TYPE | JPEG | WAVELET #1 | MPEG |
|  | COMPRESSION RATIO | 50% | 30% | X |
|  | AUTO MODE | NO | NO | YES |
| AUDIO PARAMETERS | NUMBER OF CHANNELS | 1 | 1 | 2 |
|  | SAMPLING RATE | 64KBS | 64KBS | 64KBS |
|  | COMPRESSION TYPE | NONE | NONE | MPEG |
|  | COMPRESSION RATIO | 0 | 0 | X |
|  | AUTO MODE | NO | NO | YES |
| CONTROL | LOCAL | YES | YES | NO |
|  | REMOTE | NO | NO | YES |
|  | ON DEMAND | NO | NO | YES |
| TRANSPORT PARAMETERS | REAL TIME (NO ERROR CORRECTION) | YES | NO | X |
|  | VERIFIED (WITH ERROR CORRECTION) | NO | YES | X |
|  | VARIABLE | NO | NO | X |
|  | AUTO MODE | NO | NO | YES |
|  |  | 0%    30% | 50% | 75%    100% |
|  |  |  | % BANDWIDTH UTILIZATION |  |

FIG. 8

X = DON'T CARE AUTO WILL ADJUST

US 7,944,484 B2

SELF-CONTAINED WIRELESS CAMERA DEVICE, WIRELESS CAMERA SYSTEM AND METHOD

This is a continuation patent application of U.S. patent application Ser. No. 10/351,906 entitled "Self-Contained Wireless Camera Device, Wireless Camera System and Method" filed Jan. 27, 2003, which is a divisional patent application of U.S. patent application Ser. No. 09/102,457 entitled "Self-Contained Wireless Camera Device, Wireless Camera System and Method" filed Jun. 22, 1998 for which priority is claimed.

FIELD OF THE INVENTION

This invention relates to wireless camera devices, including but not limited to video camera devices and still image devices, and it relates to a wireless camera system comprising a self-contained wireless camera device in combination with a base station device. It also relates to an architecture for provision of peripheral devices in such a system.

BACKGROUND OF THE INVENTION

Simple master-slave portable wireless video recording devices have been proposed in the past, designed to produce video and associated signals and transmit these wirelessly to a recording station. U.S. Pat. No. 4,097,893 describes one such analog device, in which start and stop (i.e. pause) operation of the recording station is controlled from the camera station. Communication of images from the camera station to the recording station is over a VHF or UHF radio channel.

The establishment by the Federal Communications Commission of a nonrestrictive usage frequency band in the 5 GHz range, with channel bandwidth capability for high throughput multimedia data transmission creates a new opportunity for wireless consumer devices having broader bandwidth capability than has heretofore been possible. The ability to efficiently use these frequencies requires greater attention to be given to bandwidth management.

Functionality of previously proposed wireless camera devices has been fairly limited and such devices have so far found little or no acceptance in the consumer marketplace. There is believed to be a demand for a compact, highly functional, broadband wireless camera device.

DETAILED DESCRIPTION OF THE DRAWINGS

Figure 1:
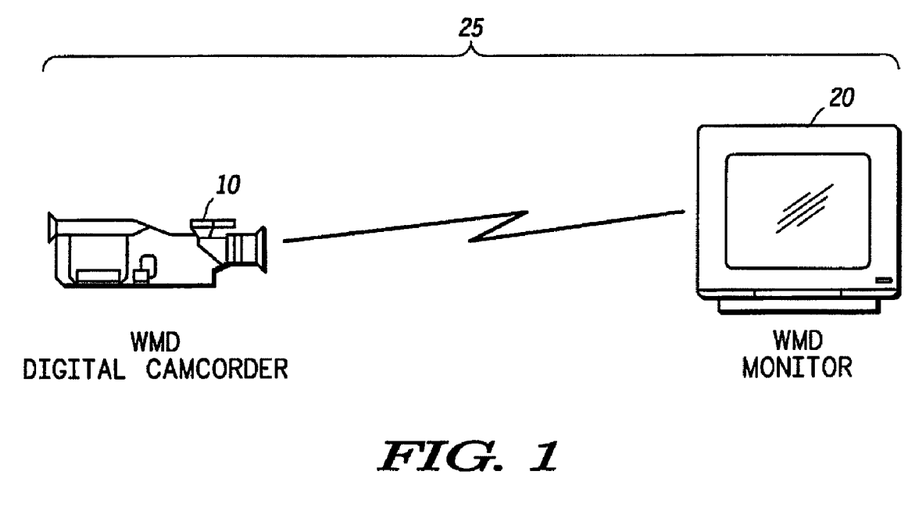
FIG. 1 is a schematic view of a simple point-to-point multimedia device network in accordance with the invention.

Referring to FIG. 1, a basic configuration of a system 25 according to a preferred embodiment of the present invention is shown, comprising a camera device 10 and a base station 20, which is illustrated in a basic form as being a radio base station with a monitor, but can be a mere storage and replay device without a monitor or can be a gateway device.

A first stage in defining the potential for a high quality video/audio-based product, such as that of FIG. 1, lies in creation of a basic set of enabling technologies. These technologies are predicated on the concept that a dedicated set of data transfer and control protocols can enhance the overall performance and cost profiles of any end product schemes utilizing the approach. The following proposed hardware architecture and communications protocol is intended to provide this low cost/high performance solution. The dedicated purpose wireless protocol layering model described provides operating advantages via a tightly coupled integration of communication protocols, which are targeted to provide an optimum solution to the very specific application of transferring optimized blocks of audio/video information in a high frequency digital state. The architecture is consequently less costly based on this narrower set of protocol requirements and the tighter integration of the layers. Because the communication protocol processing is highly integrated, it reduces the general protocol service access requirements needed in more generally applied interchangeable protocol modules. It has a focused set of requirements and can thus be implemented at a very high level of integration, such as a single chip Application Specific Integrated Circuit (ASIC), which reduces the cost of many components while providing the speed needed for some of the higher data rates.

Figure 2:
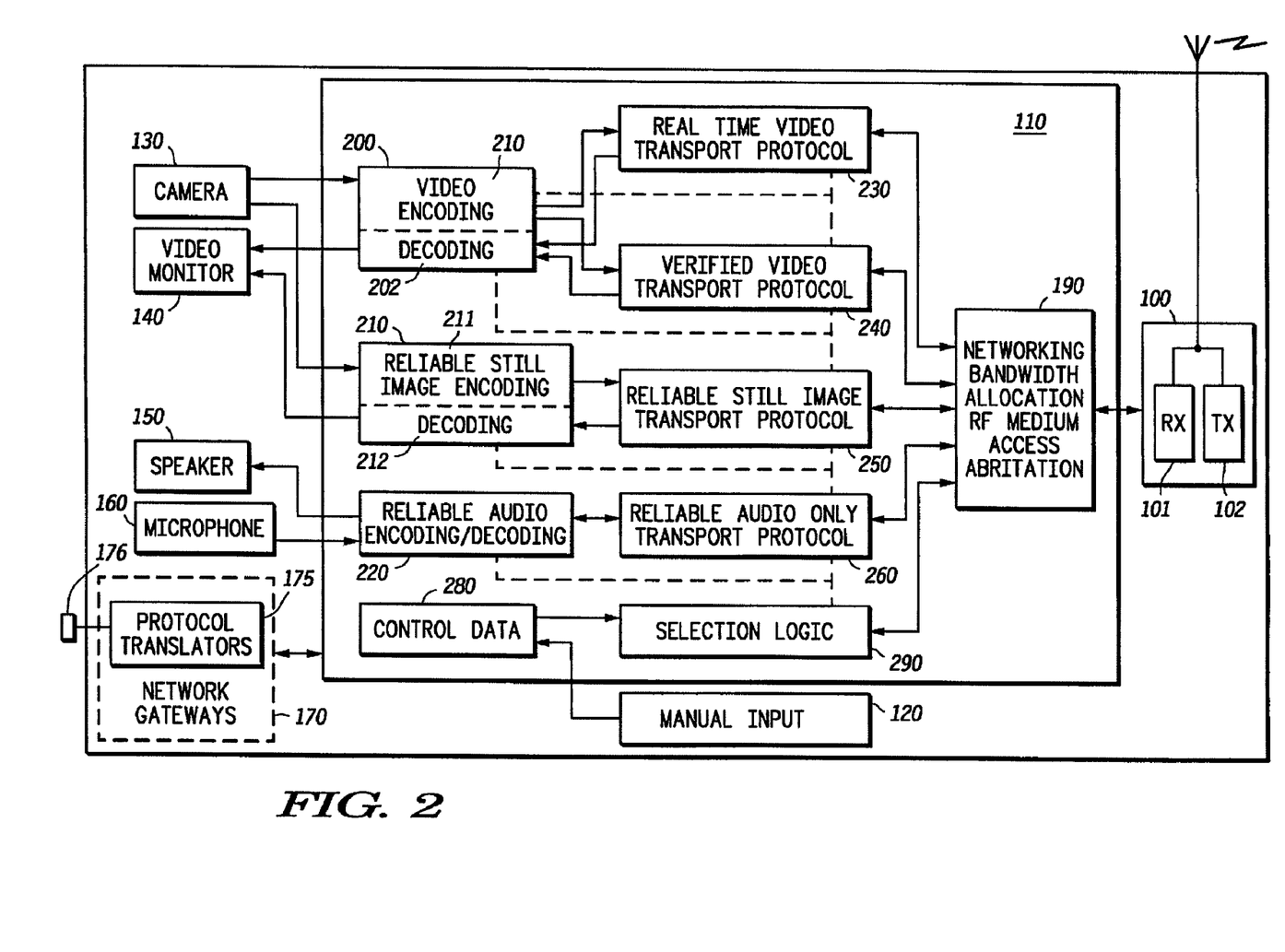
FIG. 2 is a block diagram illustrating the elements of a wireless camera device according to the preferred embodiment of the invention, with optional additional elements for purposes of description of a wireless gateway.

An architecture for a wireless device is illustrated in FIG. 2. The device comprises a full duplex RF transceiver 100 connected to a processor 110, which in turn is connected to a manual input 120 (such as a keypad or control panel), a camera 130 (which has still image and video capability but more generally is any image capture device), a video monitor 140, a speaker 150, and a microphone 160. The transceiver 100 comprises a receiver 101 and a transmitter 102.

A network gateway 170, with protocol translator 175, is also shown in phantom outline. This network gateway is optional in a self-contained wireless camera device and is illustrated here for purposes of later explanation and description of a base station.

The processor 110 can be a microprocessor or digital signal processor or can take the form of an ASIC (with or without an integrated microprocessor). The exact implementation is not important. The processor 110 comprises a video encoding/decoding module 200 (having video compression circuitry 201 and decompression circuitry 202) coupled at an input and an output of the processor to the camera 130 and the video monitor 140 respectively; a still image encoding/decoding module 210 (having video compression circuitry 211 and decompression circuitry 212) also coupled at an input and an output of the processor to the camera 130 and the video monitor 140. It also comprises audio encoding/decoding module 220 coupled at an input of the processor 110 to the microphone 160 and at an output of the processor to the speaker 150.

Within the processor 110 there is also a communications controller 190 coupled to the RF transceiver 100. Coupled between the video encoding/decoding module 200 and the communications controller 190 are a real time video transport protocol module 230 and a verified video transport protocol module 240. Coupled between the still image encoding/decoding module 210 and the communications controller 190 are a still image transport protocol module 250. Coupled between the audio encoding/decoding module 220 and the communications controller 190 is an audio transport protocol module 260. Selection logic 290 is provided, coupled by control connections (shown in dotted outline) to the various modules 200-260. The selection logic 290 is coupled to the communications controller 190 and to a control data-generating module 280, which is coupled to the manual input 120.

In the preferred embodiment, still image encoding/decoding module 210 performs discrete cosine transform or block oriented image compression, such as JPEG (Joint Photographers Expert Group) compression and video encoding/decoding module 200 performs full frame compression, such as wavelet or MPEG (Motion Picture Expert Group) compression. Other types of compression can be used in the modules.

In operation, images are captured by the camera 130 and encoded in either video encoding/decoding module 200 or still image encoding/decoding module 210. They are passed to the respective transport protocol module 230, 240 or 250 and passed to the communications controller 190 for transmission by the RF transceiver 100 over a wideband radio channel. At the same time they can be displayed on video monitor 140. Images are received by the RF transceiver 100 and passed by the communications controller 190 to a selected one of the protocol modules 230, 240 and 260 and from there to the corresponding video encoding/decoding module 200 or still image encoding/decoding module 210 for decoding and for display on the video monitor 140.

Audio signals are received by the microphone 160, encoded in encoding/decoding module 220 and passed to the communications controller 190 via audio transport protocol module 260, for transmission (with accompanying video signals if selected). Audio signals are received by the transceiver 100 (e.g. with accompanying video signals) and are passed by audio transport protocol module 260 to audio encoding/decoding module 220, where they are decoded and output from the speaker 150.

Different transport protocol modules such as modules 230 and 240 are selected according to the application that the user selects for operation. Thus, real time video transport protocol module 230 is selected for real time video and minimizes delay of transmission and delay variation to avoid "jitter", while verified video transport protocol module 240 performs error correction or selected retransmission to provide error-reduced transmission at the expense of delay in transmission. The selection of the transport modules 230-260 and the encoding/decoding modules 200-220 is performed by selection logic 290.

There are two principal processes by which selection logic selects the desired transport modules and the encoding/decoding modules. The first method is by manual selection via the manual input 120 and the second method is by receipt of commands from the RF transceiver 100.

To manually select a transport module and corresponding encoding/decoding module, the user selects an application using the manual input 120. For example, the user can select real time video mode, or verified video mode, or sill image mode and control data generating module 280 generates corresponding control data for selection logic 290 to select the corresponding transport protocol module 230,240 or 250 and its corresponding encoding/decoding module 200 or 210.

To remotely select a transport module and corresponding encoding/decoding module, control data is received via radio transceiver 100 and passed to selection logic 290 via communications controller 190. As before, the selection logic selects the corresponding transport protocol module 230, 240 or 250 and its corresponding encoding/decoding module 200 or 210.

Under control of the manual input 120, control data generating module 280 can generate control data for transmission via the communications controller 190 through the RF transceiver 100 to another camera device or to a base station over the wideband radio channel. If sent to another camera device, the control data is received by corresponding selection logic in the remote camera device. When control data generating module 280 generates control data for transmission to a remote camera device, it can simultaneously cause a selection-by-selection logic 290 of corresponding encoding/decoding and transmission modules in the device 100.

Control signals or commands that can be generated by control data generating module 280 fall into three categories: video control commands, video quality control commands and bandwidth control commands. Video control commands include pause, replay, rewind and fast-forward. They also include sets of commands that cause selection of automatic mode vs. manual mode. Video quality control commands include frame size, frame resolution, frame rate, compression type and compression ratio. Bandwidth control commands define percentage of allocation of bandwidth for a given camera or from one camera to another, expressed as a bandwidth allocation value or a proportion of available bandwidth for as the number of camera devices permitted in a band.

Video encoding/decoding module 200 and real time video transport protocol module 230 can together be viewed as first video processing and video reconstruction circuitry that provide to the transceiver 100 selectively processed first video signals processed according to a selected protocol scheme and provide reconstructed second video signals to the monitor 140. Similarly, video encoding/decoding module 200 and verified video transport protocol module 240 can together be viewed as second video processing and video reconstruction circuitry that provide to the transceiver 100 selectively processed first video signals processed according to a different selected protocol scheme and provide reconstructed second video signals to the monitor 140. Similarly, reliable still image encoding/decoding module 210 and reliable still image transport protocol module 250 can together be viewed as third video processing and video reconstruction circuitry.

Each selected protocol scheme has at least one of a selectable transport protocol, a selectable image coding (compression/decompression) protocol, a selectable audio protocol scheme and a selectable control protocol. Selection of different protocols gives rise to different bandwidth usages and allows more optimized or balanced usage of available bandwidth.

The architecture described and illustrated integrates the various communication protocol layers into a common processing block between the physical layer and the application layer. This architecture decouples the communication protocol layers from the RF transceiver functional block. It also decouples the communication protocol layers from the multimedia I/O which represents the application layer. The architecture is based upon a presumed system in which a variety of transmission and reception devices are operating.

Encoding/decoding algorithms and transport protocols are configured and optimized based on the multimedia data type and the user's preferences. These various data paths converge upon the more common networking, bandwidth allocation, and RF medium access protocols.

FIG. 2 shows that there are differences in transport protocol for real time video and verified video. Real time video, and real time audio are isochronous. This means that these transport protocols must balance the reliable transfer concerns with the timing required for proper presentation at the receiving end. For verified video or audio, the intended immediate destination for the multimedia data is not real time presentation, but rather storage. It is referred to as "verified" since higher levels of reliable transfer (e.g. higher error correction and/or retransmission) can be used without high bandwidth usage.

Figure 3:
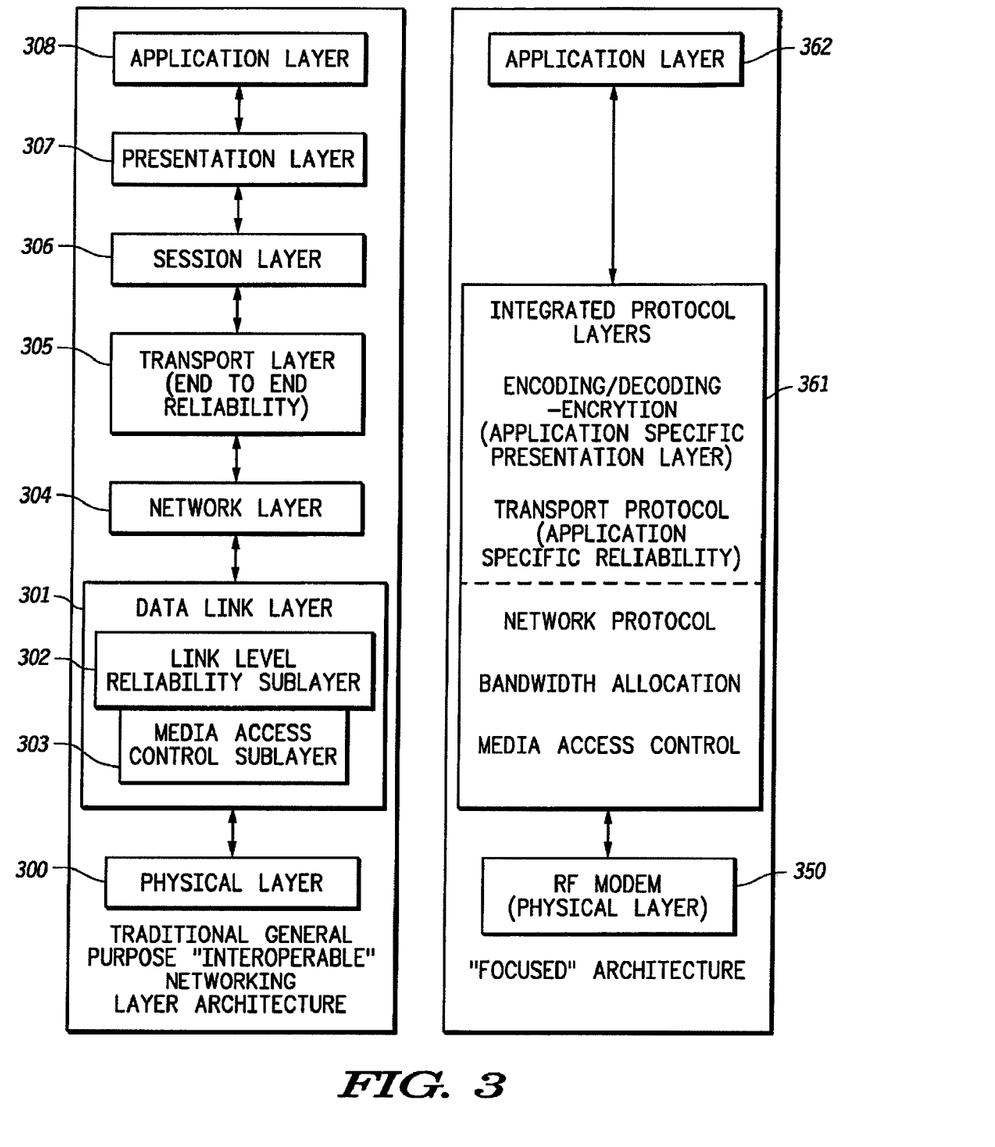
FIG. 3 illustrates a comparison between the protocol structure of a device according to the preferred embodiment of the invention and a standard protocol structure.

The protocol layer stack model to be used in the proposed architecture is compared to the International Telecommunication Union (ITU) standard network protocol layer model in FIG. 3.

On the left hand side of the figure, the standard ITU protocol layer model is illustrated, comprising a physical layer 300 and a data layer link layer 301 having a link level reliability sub-layer 302 and a media access control sub-layer 303. Above the data link layer is a network layer 304 and above the network layer 304 are a session layer 306, a presentation layer 307 and an application layer 308. To the right of this standard model is illustrated, for purposes of comparison, the protocol layer stack model for a camera device according to the preferred embodiment of the invention. This model comprises an RF modem 350, a layer 361 which integrates encoding/decoding, encryption, transport protocol, network protocol, bandwidth allocation, and media access control. The encoding/decoding and encryption is an application specific presentation layer. The transport protocol is an application specific reliability protocol. Above these integrated protocol layers is the application 362.

The RF modem layer 350 is implemented in the full duplex RF transceiver 100 of FIG. 2. The integrated protocol layers 361 are implemented in the processor 110 of FIG. 2 and the application layer 362 is implemented in the form of the camera 130, the video monitor 140, the speaker 150, the microphone 160, and the network gateways 170 of FIG. 2. In the preferred embodiment, the integrated protocol layers 361 are admitted on a logic board and a radio control board, in which processes of the protocol below the dotted line of FIG. 3 are implemented on the radio control board and processes above the dotted line are implemented on a logic board. In effect, this has the result that the encoding/decoding modules 200, 210 and 220 and the transport protocol modules 230, 240,250 and 260 are all implemented on the logic board and the communications controller 190 is implemented on a separate communications control board. The selection logic 290 and the control data-generating module 280 are implemented on the logic board. These details are, of course, not critical and greater integration can be achieved with all the elements of the integrated critical layers being implemented in a single, highly integrated module.

The advantages of a proprietary multimedia communications protocol stack over the ITU standard for this architecture is optimum use of bandwidth, cost, performance, and the flexibility to tailor the protocols for the various multimedia transmissions.

The ITU standard seeks to define each layer independently and to define a set of protocol access points between each layer. The strict interpretation of this model results in creating a set of interchangeable protocol building blocks that provide a very general solution to digital communications networking. Each general purpose protocol building block tends to be a costly, yet reasonable solution for a broad range of networking challenges. This architecture is critical for heterogeneous, standardized networks that are built from commercially available, interoperable components. Conversely, the dedicated purpose architecture now described builds a homogeneous RF wireless network with a uniquely qualified set of components.

The architecture described focuses upon providing optimum solutions for a particular family of wireless devices. It provides transmission reliability at the link layer and not on an end-to-end regime. (An end-to-end reliability is not needed since there is no multiple-hop routing in the common uses of the wireless network.) If an application is developed which needed end-to-end reliability within the wireless network, layers can be added between the application layer 362 and the integrated protocol processing block 361. For the current applications, the transmission reliability is specific tailored to the needs of the user, the multi-media data type being transferred, and the RF environment.

Figure 4:
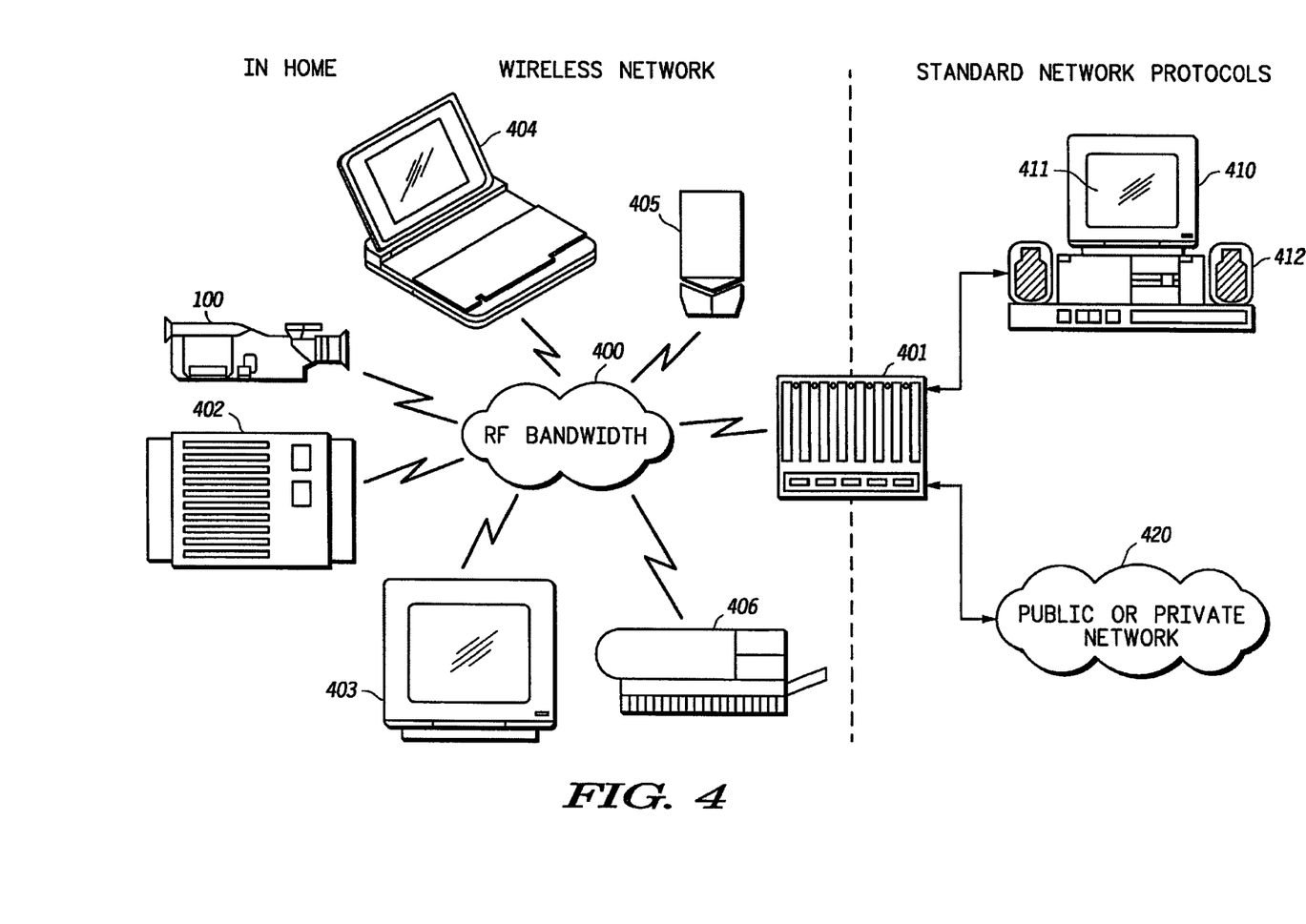
FIG. 4 illustrates a wireless camera system according to a preferred embodiment of the invention.

The architecture described operates in a somewhat closed homogeneous RF wireless network. The limited set of components that operate within the network only need to be interoperable with each other. The closed nature of the network allows value added features to be included, with a controlled, limited impact upon existing device interoperability. The ability to include such value added features, allows the wireless product developer to differentiate this product from the others in the market using other network approaches. The closed aspect of this architecture does not, however, limit interoperability with other, more general purpose networks. Network gateways 170 bridge the wireless network with other standard networks. FIG. 4 illustrates the use of a gateway to interconnect the proposed wireless network to standard networks.

The presence or absence of network gateways 170 in a particular device depends on the function of that device. For example, a self contained wireless video or still camera need not have network gateways 170, while a dedicated base station preferably has network gateways 170 but does not have the camera 130, video monitor 140, speaker 150 or microphone 160. Accordingly, the particular application layer devices that are included in any particular product will depend on the intended function of the camera device product.

Referring to FIG. 4, the wireless camera device of FIG. 1 is shown communicating over a wideband radio channel 400 to a wireless multimedia gateway 401 and a wireless disk drive 402 and a wireless monitor 403, as well as other miscellaneous devices which will not be described in detail, but may include a lap-top computer 404, a remote control device 405 and a printer 406. Each of the devices 100 and 401 thru 406 has an architecture as described with reference to FIG. 2 and FIG. 3. The gateway 401 communicates with a multi-media personal computer 410 having a monitor 411 and audio speakers 412 and it communicates with a public or private network 420.

The wireless multimedia gateway depicted in FIG. 4 provides protocol translation to convert the wireless protocol to the standard public network protocol or the standard PC interface protocol. The gateway converts the focused, optimized protocol used on the wireless network to general purpose protocol, such as Internet protocol (IP) used in the open system networks. In essence the gateway provides the wireless network devices with points of interoperability to outside systems. The provision of the gateway 401 has a number of advantages, including the ability to network multiple camera devices and operate them under remote control.

This invention, in its preferred embodiment, also provides flexibility of bandwidth usage for video quality and transmission reliability tradeoffs. Bandwidth can be traded for video quality and transmission reliability based on the needs of a given application. The approach described is inherently bandwidth sensitive. The estimated peak bandwidth limit is at least 10 Mbps. This rate is sufficient to support various combinations and quality levels of the transmission of video, still images, audio, data, graphics and text. A goal is to provide a bandwidth usage strategy that will accommodate the maximum number of devices in a wireless network with highest possible transmission reliability and the level of video quality necessary for a given application.

Video quality and reliability are singled out for discussion over other multimedia types because of the large demand placed on bandwidth by video transmission and the bandwidth tradeoffs that are possible with video. Video quality is represented as resolution of each video frame, the rate at which the video frames are updated and compression rate of the transmitted video.

The resolution of still images that make up the video are only limited by the image sensor of the camera. Given a high end image sensor, video resolution can be supported in a range from HDTV (high definition television) or high resolution computer monitor quality to very small thumbnail images. The lower the video resolution the more grainy the video image appears. Higher video resolution will require commensurate higher bandwidth usage for transmission. Selection of video resolution is based on the application demands and/or the user's preferences.

Video frame rate is the speed that still image frames are presented upon the monitor of the base station 20 or the monitor 140 of the camera device to produce the illusion of full motion video. The described technology can support video frame rates ranging from National Television Standards Committee's (NTSC) standard of 60 interlaced fields per second through stop action video used for video conferencing to single frame still images. Slower than the above noted video frame rates can introduce an unintended effect of jerkiness in the motion of high speed "action" video sequences. Faster video frame rate signals will require higher bandwidth usage for transmission. Selection of video frame rate is, again, based on the application demands and/or the user's preferences.

Video compression rate is an indication of the amount by which the video data has been reduced using various compression techniques. For instance, broadcast quality, uncompressed digital video requires a bandwidth of 150 Megabits per second (Mops). Given 10 Mbps limit of the RF subsystem, uncompressed digital video transmission is not practical. Current standard video compression algorithms, including MPEG, wavelet, or H.320, will compress video to within these speed limitations. Any video compression will cause some loss of the video data, but the amount of loss can be limited based on the video compression rate. Lower rates of video compression provide higher perceived image quality and use more bandwidth. The compression ratio/bandwidth tradeoff is dependent upon the application. A baby monitor, for instance, could operate with a high video compression rate and use less bandwidth because of the lower demands for image quality.

As with video quality, the unique timing requirements of video directly relate to reliability. As discussed earlier, there is a different set of concerns with the transmission of real time video versus verified video. As previously noted, real time video is a video stream that is played back, to the user's perception, immediately upon reception. Verified video, or non-real time video, is not intended to be played back immediately, but rather is stored for later viewing.

The transmission of real-time video must be isochronous to prevent buffer over flow or underflow in the receiving end. In other words a steady flow of video data must be received such that it can be displayed without either running out of or being overrun by video data. Non-real time video is not sensitive to this problem, unless the transmitting end is in danger of overrunning its buffers between the image acquisition and transmission phases.

The transmission of real time video and non-real time video presents a tradeoff in reliability. The reliable transmission of video data that results in later video delivery for a real time application serves no purpose. Specifically, video that is not received within the presentation time will cause a frame skip. In the event that a frame is to be presented but has not been completely received, a buffer underflow condition occurs which results in a frame skip. Transmission of non-real time video is not constrained by the timing of immediate playback. As a result more reliable transmission methods can be used to create a non-real time yet verified video transmission, thus the term "verified video".

Figure 5:
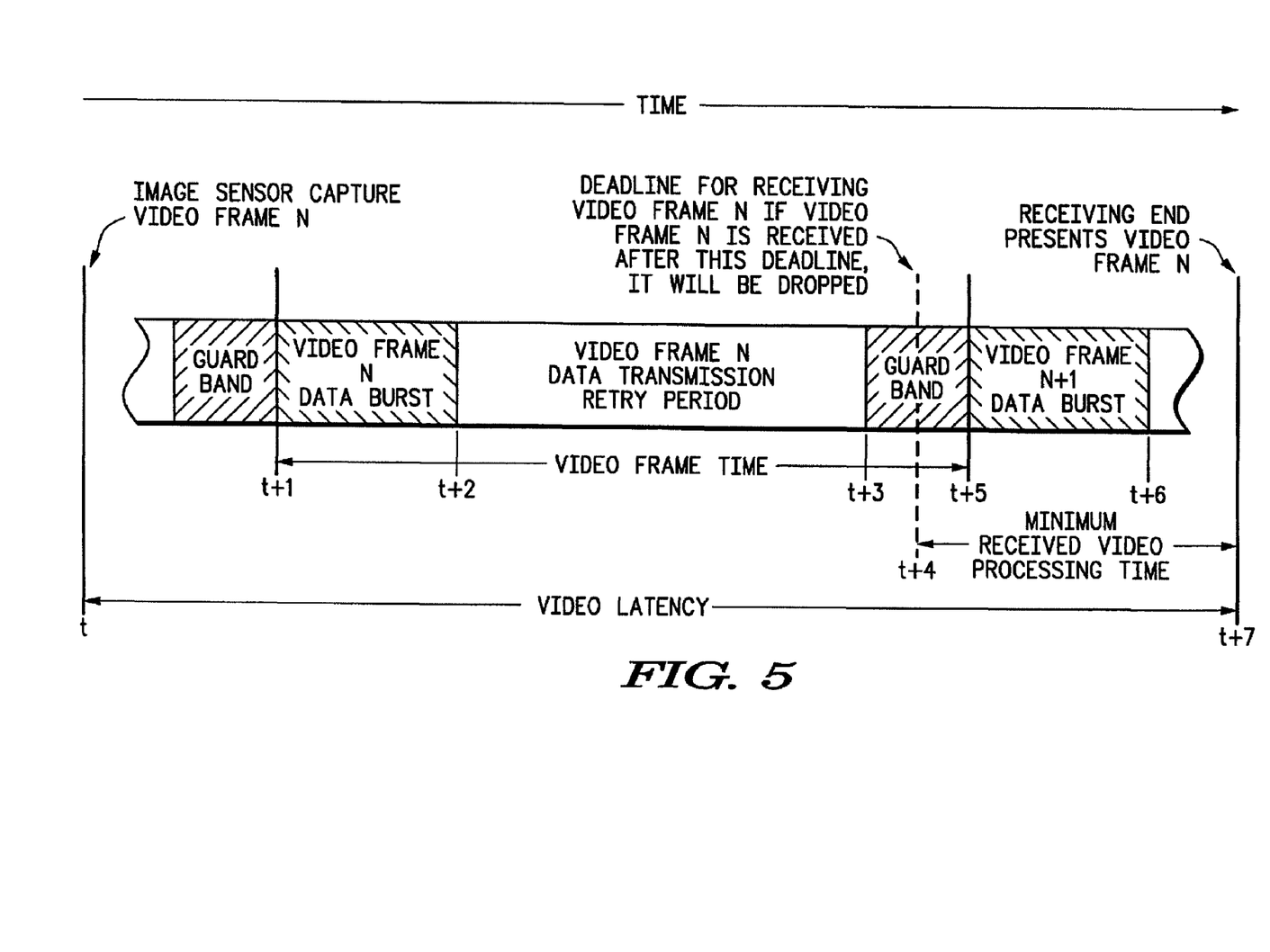
FIG. 5 is a time diagram illustrating video frame transmission for the purposes of explanation of re-transmission.

Re-transmission can be used to provide some limited measure of reliability for real time video transmission. A goal of this method is to provide time for transmission retries prior to presentation time. The method tends to balance the amount of reliability and allocation, with bandwidth or larger receive buffer sizes and increased video latency. FIG. 5 presents a simplified example of video frame transmission timing which illustrates some of the parameters for the retransmission method. In practice the technique may be complicated by such issues as the MPEG video compression scheme, which does not always transmit full video frames.

As FIG. 5 shows, a burst of video frame data at bandwidths higher than the constant video rate will provide time for transmission retries prior to the next video frame burst. Beginning at time t the image capture device (e.g. camera 130) has captured a complete video frame N. Starting at this time it is the function of the transport protocol layer to deliver this frame reliably to the corresponding transport protocol layer at the receiving end.

Time t+1 (which occurs following a guard band following preceding activity on the channel), the transmitter transmits the video frame N in a data burst, completed at the time t+2. Starting at time t+2, there is a period extending to time t+3 during which the transport protocol layer module of the receiving device (specifically verified video transport protocol module 240 of FIG. 2) receives the video frame N data burst, performs error correction using any embedded error correction code in the data burst and determines whether the data burst is received correctly. If it is not received correctly, the verified video transport protocol module of the receiver sends a negative acknowledgment message to the verified video transport protocol layer module of the transmitter and there is an opportunity for the transmitter to perform a re-try, retransmitting video frame N data burst. At time t+4 illustrated by the dotted line in FIG. 5, there is a deadline for receiving video frame N. If the receiver does not successfully receive video frame N before this deadline, the video frame is dropped.

The receiver has a timer (not shown in FIG. 2) which commences timing at time t+2 (or can commence timing at t+1), as measured at the receiving end, and if the receiver transport layer protocol cannot determine before time t+4 that frame N has successfully been received, it drops the frame and awaits the next video frame data burst N+1. This data burst is transmitted by the transmitting device at time t+5, ending at time t+6. The receiver (assuming it has successfully received video frame N data burst) waits until time t+7 before presenting video frame N on the receiver monitor. By delaying until time t+7, the receiver has the time from t+4 until t+7 as its minimum received video processing time. If the receiver fails to receive video frame N data burst, it can simply present the preceding video frame. The overall latency in the system is from time t to time t+7. Every frame will be delayed by the receiver until time t+7 (regardless of whether the frame was received before time t+4), with the result that jitter at the receiver monitor is avoided.

Using this technique, average video bandwidth increases based on the average number of retries. The video burst rate of bandwidth that is needed to support this method depends upon the amount of time left for retries, which in turn dictates the reliability of the transmission.

Time for transmission retries can also be increased by providing more buffer space for in transit video data. Increased buffering will increase the video latency which, as shown in the FIG. 5, is the time between capturing and presenting the video. The amount of acceptable video latency will be dependent upon the application. For example, long video latencies in a two-way interactive video application can be awkward and distracting to the users.

Real time audio is also isochronous and as such shares these same issues. However, due to lower bandwidth requirements for audio, this issue is not as costly to solve in terms of bandwidth, processing power, and end-to-end latency.

In case of audio/video program transmissions, the audio and video presentations are synchronized.

The method of access control to the RF media is not critical. Methods that can be employed include Frequency Division Multiplex (FDM) techniques or Time Division Multiplex (TDM) techniques or in some advanced cases Code Division Multiplex (CDM) techniques. Methods may also include fixed allocation of bandwidth or dynamic allocation of bandwidth based on need.

It is not critical whether a decentralized type of media access control is used in, or a direct central control of allocation by a gateway is used. For instance, decentralized control has the advantage of allowing any combination of wireless devices to interact, without the added expense of a central control unit. A decentralized control approach also minimizes the risk of single point failure.

The wireless transmission technology in the lightly regulated environment of the 5.2 GHz band is very flexible. The flexibility of this technology can be taken advantage of to develop a whole family of products, each with its own characteristic use of the technology. Those products share many common attributes. For example, if they are to interoperate at the local area level, each must: support a subset of the various multimedia transport protocols; provide the RF and antenna control sections; and share a networking and RF media access control algorithm.

One of the primary issues of a network protocol in a wireless network is to allocate bandwidth and time slots to the members of the network. This issue favors a tight integration of network and media access control layer. For the purpose of explanation of bandwidth allocation and control, FIG. 6 is presented, illustrating a network such as that of FIG. 4 with the addition of second and third wireless camera devices 600 and 601.

Figure 6:
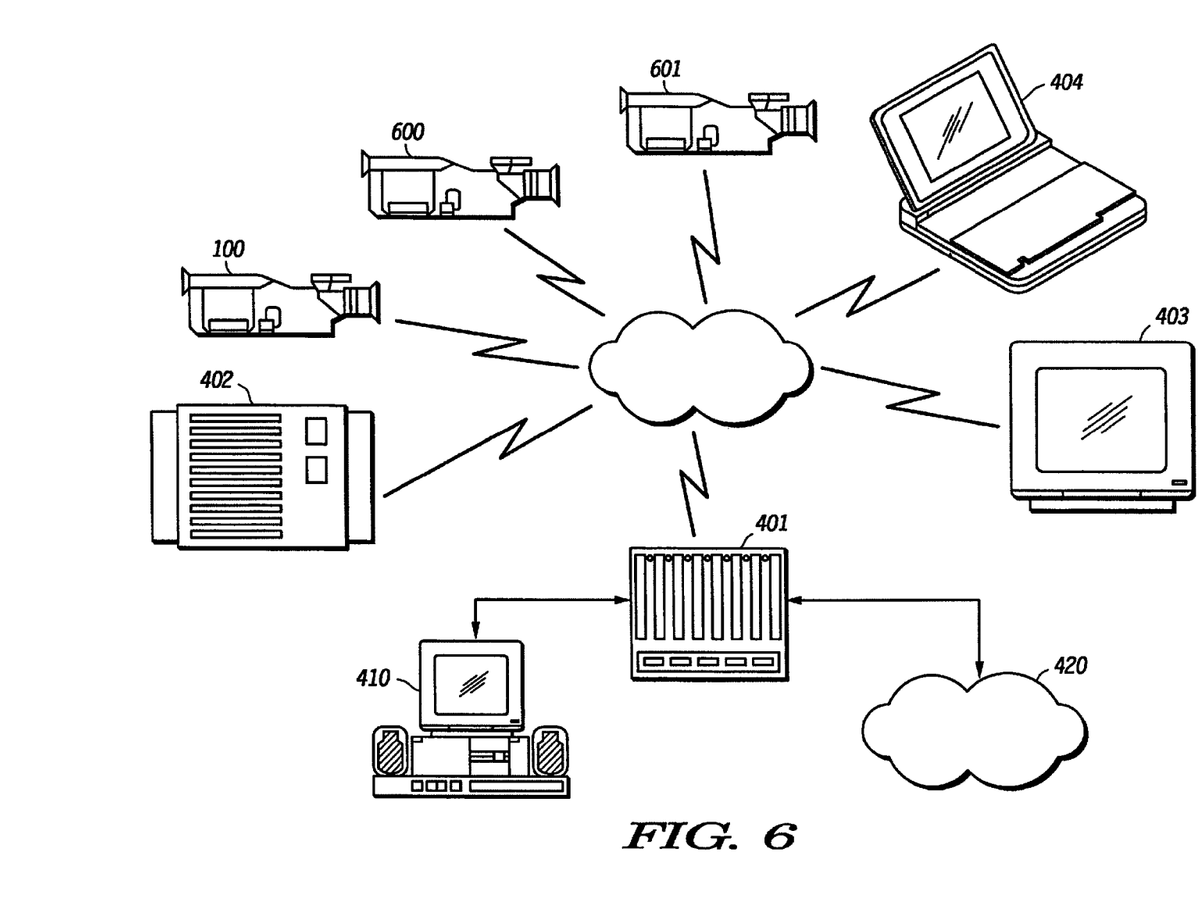
FIG. 6 is a system similar to that of FIG. 4 but with additional wireless camera devices.

In the complex network, of FIG. 6, a "smart" control of bandwidth based on the user's intentions is provided.

Under this scenario, the user may have multiple low resolution video inputs. In the event that the user wishes to focus in detail on the output of a single video source, e.g. wireless camera device 600, commands to increase frame rate or resolution may be sent to the camera device 600 (or other input device). At the same time, commands are sent to the other video image capture devices 100 and 601 to reduce their frame rates or resolution in an effort to balance the bandwidth usage.

The capability described enables the organization of a number of "local" RF clusters of devices into logically accessible "higher level" groups that shield the user from the specific internal system details of that organization, and still permit an authorized remote user to modify the operation of any particular device.

Figure 7:
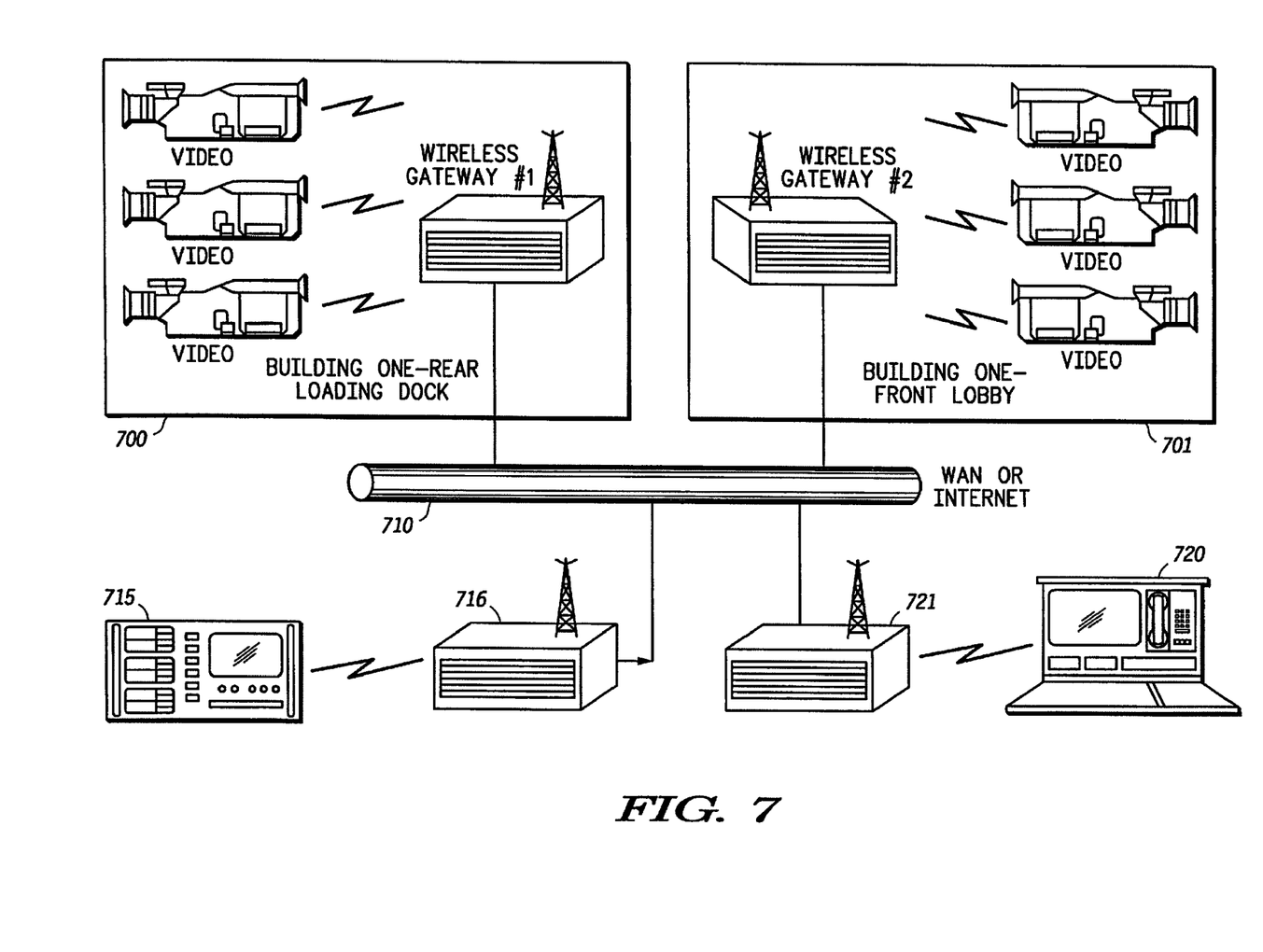
FIG. 7 illustrates a system similar to that of FIG. 6, in the context of a security system.

One simple application example that could use this approach would be a campus security system illustrated in FIG. 7 that has a considerable number of wireless devices providing audio and visual surveillance. These devices could be arranged in groups 700 and 701 at various physical locations, (for instance at doors and windows of the buildings in the complex). These "local" RF clusters of devices could be interconnected by standardized Local Area Networks (LAN's) 710 to provide access to the devices from display equipment located anywhere on the LAN (e.g. security monitoring stations 715 and 720 via wireless gateways 716 and 721).

This approach to organizing the access to the devices provides a very powerful logical mapping or switching capability. For instance, the media information from a group of cameras located on the rear of the first building could be accessed as a single file of media data that contains multiple time stamped views and is logically labeled as "Building One—Rear Loading Dock". In addition, the users operating the display equipment could change various operating parameters of the surveillance equipment for maximum flexibility.

Figure 8:
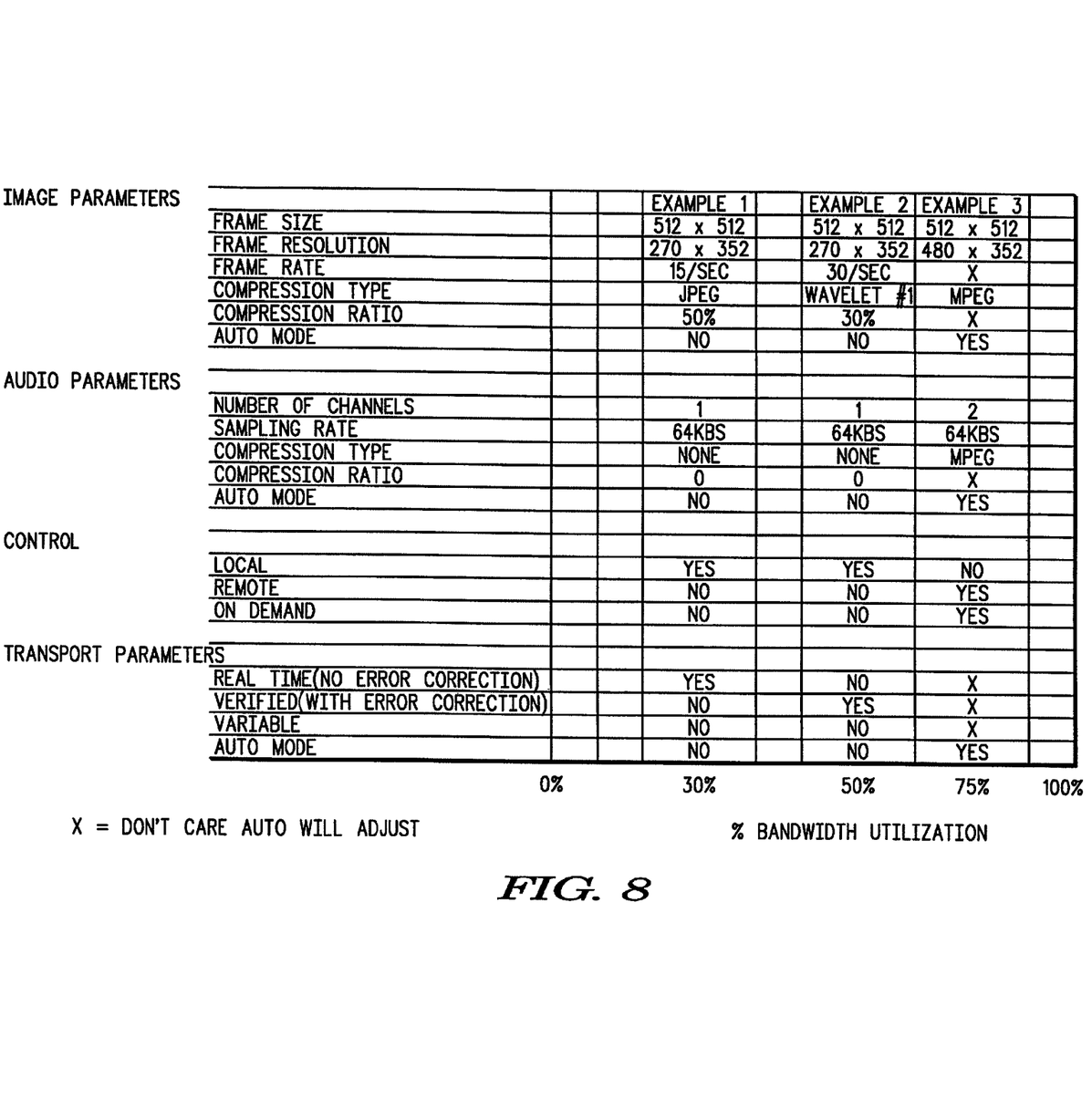
FIG. 8 is a table illustrating examples of selection of different combinations of parameters for the purposes of bandwidth control.

FIG. 8 illustrates examples of various parameters that can be adjusted to control bandwidth utilization between multiple devices operating on a common bandwidth. The various rows in the table of FIG. 8 are different parameters that can be adjusted or selected and the different columns show various examples of how these parameters give rise to different bandwidth utilization estimates.

The adjustable parameters fall into four broad categories: image parameters, audio parameters, control parameters and transport parameters. Selectable image parameters include frame size, frame resolution, frame rate, compression type, compression rate, compression ratio and auto mode. Selectable audio parameters include number of audio channels, sampling rate, compression type, compression ratio and auto mode. Control parameters include local operation, remote operation and on-demand mode. Transport parameters include real time (i.e. no error correction) verified (i.e. with error correction), variable and auto mode.

In examples 1 and 2 of FIG. 8 the frame size is 512×512 and the frame resolution is 270×352. In the first example the frame rate is 15 frames per second, the compression type is JPEG, the compression ratio is 50% and auto mode is off. In the second example, the frame rate is 30 frames per second, the compression type is wavelet #1, the compression ratio is 30% and the auto mode is off. For examples 1 and 2 the audio parameters are the same and the control parameters are the same. In example 1 error correction is used while in example 2 error correction is not used. As a result of these alternative selections of parameters, example 2 gives rise to higher bandwidth utilization than example 1. In the table the estimated bandwidth utilization of example 2 is 50%, while the estimated bandwidth utilization for example 1 is only 30%.

From this, it can readily be seen that two cameras can simultaneously be operated using the high frame rate and high level of verification of example 2, but if a third camera device is to enter the same bandwidth, it would be preferable (indeed necessary) for all three cameras to revert to the combination of parameters illustrated in example 1. The switching from the set of parameters of example 2 to the set of parameters of example 1 takes place in response to each camera that is operating according to the parameters of example 2 receiving a control command requiring those cameras to degrade to a lower bandwidth utilization. The control command can come from a central controller such as the security monitoring station 715 of FIG. 7 or can come from the third camera (e.g. camera device 601 of FIG. 6) making a request to enter the shared bandwidth. The latter scenario provides an ad hoc network in which all users would voluntarily degrade as the network became more congested. In such an arrangement it is preferable to provide a minimum level of service (e.g. that of example 1) beyond which a given device would not degrade further. Upon reaching this minimum level of service, all devices being requested to degrade respond with a negative acknowledgment, in effect telling the requesting device that no further bandwidth is available.

The third example of FIG. 8 has the same frame size as the first two examples, but has a higher frame resolution of 480× 352 pixels and uses MPEG compression. Two audio channels are provided, using MPEG audio compression, and remote and on demand control is enabled. In this example, a single wireless camera device will use 75% of the available bandwidth. Clearly when a single camera device operates using these parameters, no other device is able to enter the channel (unless that other device can enter at a bandwidth utilization even lower than the bandwidth utilization of example 1).

In the scenario of FIG. 7, in the event that a user monitoring the surveillance area from one of the security monitoring stations 715 and 721 wishes to examine with greater scrutiny a particular camera, a command can be sent to one of the cameras (e.g. camera device 601 of FIG. 6) instructing that camera to increase its resolution as shown in example 3 of FIG. 8 and to change its compression type, while at the same time frames are sent to other camera devices (e.g. devices 10 and 600) instructing those camera devices to degrade completely, either by ceasing transmission or by reducing their frame rates to a very low level.

In the preferred embodiment, selection logic 290 of FIG. 2 comprises a pre-programmed table of different levels of service in which different combinations of parameters of FIG. 8 are preprogrammed. In this manner, a user can select, through manual input 120, a particular package of parameters to support a particular desired application. Examples of packages of desired parameters could include still images, scenic video, motion video, security surveillance, etc. According to the selected application, the optimum package of parameters is selected.

Referring one again to FIG. 6, the provision of gateway 401 makes the home wireless network a conduit for audio/video recording and playback, video on demand from an outside network, and wireless network browsing (as well as other functions) simultaneously. In a multi-user, multi-function environment, shared components such as monitors or disk drives 402 must be addressable and may also must provide a form of dedicated access to prevent users from corrupting each other's data.

The system is easy for the consumer to use and reconfigure. The initial products should be capable of detecting the components in the system configuration and acting accordingly. Adding a new component to the system should not pose a technical challenge to the user.

Privacy and security algorithms are included that allow a home's wireless components to interact without concern that components outside the home network can gain access or provide interference. These algorithms provide authentication and encryption. As new components that are added to the network, each is easily synchronized with the unique security "keying" that provides secure access.

Some of the main product configurations for video and/or audio delivery are: point to point video; multi-point video; full duplex video; and point-to-point, multi-point, full duplex audio.

The point to point video category encompasses the set of applications where there is a need to transmit video from an origination site to a reception site. Multi-point video encompasses the set of applications where there is a need to transmit video to or from an origination site to multiple reception sites. Full duplex video includes the set of applications where there is a need to transmit and/or receive video from two or more origination and/or reception sites.

The same options exist for audio configurations to be added to most of the video configurations.

The range of these potential configurations are illustrated by FIG. 6. Many of the potential product embodiments described based upon the core technology require connection with outside, standard networks such as the Internet. In this case, a device class for providing data translation support also present an opportunity for provision of dedicated purpose, integrated application modules. Termed "wireless gateway" for this discussion, this class of devices share some common characteristics.

Various models and options of wireless gateways may be provided. All wireless gateway models capability of receiving and transmitting at bandwidth levels that are necessary to transfer the various multimedia data types, remote control, or transport protocol signaling. Wireless gateways must be capable of supporting the features of the other devices in the premise's wireless network, as well as the user's external connection requirements. Each user will have a different set of expectations for connection to the outside world and potential hardwired networks within the household that the gateway may support.

A high end model wireless gateway could provide expansion slots for various Network Interface Cards (NIC). The fully equipped gateway may support cable modems, satellite antenna connections, and telephone lines, to the external world as well as internal hardwired networks such as Ethernet.

The wireless multimedia gateway contains the capability of high bandwidth receive and transmit. For instance, it can receive verified video and still images for storage. It may transmit video either real time to the monitor or verified video and still images for transfer to the PC or the network, or it may transmit and receive at much lower rates for remote control and transport protocol signaling.

The gateway may also provide direct access to non-wireless shared resources, such as disk drives and printers. The gateway provides the ability to receive remote control from either a directly connected PC, an incoming telephone call, or a wireless remote control device. Remote control commands from a PC or the external network may be routed to other hardwired wireless devices.

Various models of wireless video image acquisition devices such as cameras may be provided. All camera models can use high bandwidth for transmission of real time video data and each can use low bandwidth to transmit and receive for remote control and transport protocol signaling. Higher end camera models may provide more flexibility and capabilities in terms of video frame rates, image resolution and video compression rates. They may also support synchronized audio and video. Inexpensive camera applications, such as an infant monitor, can have lower target bandwidth usage by taking advantage of low resolution image sensor, fixed transmitted resolutions, slow, fixed rate video framing, and high video compression ratios.

The wireless monitor supported by this modular system could also impose a wide range of demands. In one embodiment, it could be a high bandwidth receive device and low bandwidth transmit device. It may receive real time audio/video only for immediate playback or still images for display. It, in turn, may transmit and receive at much lower rates for remote control and transport protocol signaling. Other various models of wireless video monitors may also be provided, each with its own minimum and maximum demands. For instance, some monitor models may use high bandwidth for reception of video stream data or high resolution still images. Higher end monitor models will likely provide more capabilities in terms resolution and compatibility with the higher end cameras.

Monitor 403 is able to receive real time video whether it is received from a camera or a storage device. Added options may include provision of a port for a photo printer that prints the currently displayed still image or video frame. Among the advanced features of a wireless monitor there may be an option to split the screen for inputs from various sources or display on screen information in the form of overlays or digital effects. This option is also highly dependent upon how the bandwidth is shared between various components.

The storage peripheral 402 denoted as "wireless disk drive," has the capability of high bandwidth data receive and transmit. It receives verified audio/video and still images for storage. It is also capable of receiving real time audio/video for applications that both record and play back simultaneously. An optional feature is transmission of audio/video data in either real time mode to the monitor or verified audio/video and still images for storage to the gateway. As with other network devices, the drive transmits and receives at much lower rates for remote control and transport protocol signaling. This device provides storage that can be archived and is easily expandable. (One configuration option may support a removable hard disk type device to provide such capability. For instance, one and two gigabyte removable disks are available on the market today that provide sufficient storage for log video streams and a multitude of still images. Even a 100 Megabyte removable disk would be useful for fairly extended video streams.)

More than one type of wireless video disk drive may be provided. All wireless disk drive models bear the capability of both receive and transmit using variable bandwidths needed to transfer the various multimedia data types, remote control, or transport protocol signaling. The higher end wireless disk drive models provide more capabilities in terms of storage and multiple user support features.

In summary, the system described optimizes the relatively unregulated characteristics of the new frequency allocation to provide extremely high quality transmission in a small, low cost and power efficient end product package, enabling the creation of a revolutionary class of video-enabled, personal communication devices.

The various arrangements described above and illustrated in the figures are given by way of example only and modifications of detail can be made by one of ordinary skill in the art without departing from the spirit an scope of the invention.

We claim:

1. A self-contained wireless camera device comprising:
   a camera;
   selection logic configured to obtain an indication of a selected application and to automatically select:
   a selected processing and reconstruction scheme from a plurality of processing and reconstruction schemes for an associated media type based on the indication; and
   a selected transport protocol from a plurality of transport protocols based on the associated media type and at least one characteristic of a communications channel;
   video processing and reconstruction circuitry coupled to the camera and to the selection logic, receiving video signals from the camera and providing compressed first video signals, compressed and transported according to the selected one of the at least two processing and reconstructed schemes, dependent on the indication; and
   a radio transmitter coupled to the video processing and reconstruction circuitry for transmission of the compressed first video signals over the communications channel.

2. The wireless camera device according to claim 1, wherein the video processing and reconstruction circuitry comprises first compression means and second compression means for selectively compressing the video signals according to a selected one of at least two compression schemes.

3. The wireless camera device according to claim 2, wherein the at least two compression schemes are selected from a group consisting of discrete cosine transform compression, full frame compression, wavelet compression, MPEG compression, JPEG compression, and vector quantization compression.

4. A method of operation of a self-contained wireless camera device comprising:
   obtaining an indication of a selected application;
   automatically selecting a selected processing and reconstruction scheme from a plurality processing and reconstruction schemes for an associated media type based on the indication;
   automatically selecting a selected transport protocol from a plurality of transport protocols based on the associated media type and at least one characteristic of a communications channel;
   receiving video signals from a camera and providing compressed first video signals, compressed and transported according to the selected one of at least two processing and reconstruction schemes, dependent on the indication; and
   transmitting the compressed first video signals over the communications channel.

5. The method of claim 4, comprising selectively compressing the video signals according to a selected one of at least two compression schemes.

6. The method of claim 5, wherein the at least two compression schemes are selected from a group consisting of discrete cosine transform compression, full frame compression, wavelet compression, MPEG compression, JPEG compression, and vector quantization compression.

7. The method of claim 4, further comprising:
   encrypting the compressed first video signals.

8. The method of claim 4, wherein the compressed first video signals are associated with a real-time application.

9. The method of claim 4, wherein the compressed first video signals are associated with a non-real time application.

10. The wireless camera device of claim 1, wherein the selection logic is configured to select one of the plurality of transport protocols for the associated media type based on the indication.

11. The wireless camera device according to claim 1, wherein the video processing and reconstruction circuitry comprises first transport means and second transport means for selectively transporting the video signals according to a selected one of at least two protocol schemes for the associated media type.

12. The wireless camera device according to claim 1, wherein the video processing and reconstruction circuitry comprises first compression means and second compression means for selectively compressing the video signals according to a selected one of at least two compression schemes for the associated media type.

13. A method of claim 4, further comprising:
selectively compressing the video signals according to one of a plurality of compression schemes for the associated media type.

* * * * *